United States Patent
Servant

(10) Patent No.: US 9,512,847 B2
(45) Date of Patent: Dec. 6, 2016

(54) DUAL-FLOW TURBINE ENGINE HAVING A DECOUPLING DEVICE

(75) Inventor: Regis Eugene Henri Servant, Vigneux sur Seine (FR)

(73) Assignee: SNECMA, Paris (FR)

( * ) Notice: Subject to any disclaimer, the term of this patent is extended or adjusted under 35 U.S.C. 154(b) by 493 days.

(21) Appl. No.: 14/124,963

(22) PCT Filed: Jun. 19, 2012

(86) PCT No.: PCT/FR2012/051383
§ 371 (c)(1),
(2), (4) Date: Dec. 9, 2013

(87) PCT Pub. No.: WO2012/175864
PCT Pub. Date: Dec. 27, 2012

(65) Prior Publication Data
US 2014/0119893 A1    May 1, 2014

(30) Foreign Application Priority Data

Jun. 20, 2011 (FR) .................... 11 55414

(51) Int. Cl.
*F04D 19/00* (2006.01)
*F01D 21/04* (2006.01)
(Continued)

(52) U.S. Cl.
CPC .......... *F04D 19/002* (2013.01); *F01D 21/045* (2013.01); *F01D 25/162* (2013.01); *F02K 3/06* (2013.01);
(Continued)

(58) Field of Classification Search
CPC .... F04D 19/002; F01D 25/162; F01D 21/045; F02K 3/06; F05B 2260/3011; F05B 2260/301; F05D 2250/30

See application file for complete search history.

(56) References Cited

U.S. PATENT DOCUMENTS 5,417,501 A * 5/1995 Hyde .................... F01D 21/045
                                                      384/542
5,934,868 A * 8/1999 Battig .................. F01D 21/045
                                                      415/214.1
(Continued)

FOREIGN PATENT DOCUMENTS

EP    1 308 602    5/2003
EP    1 403 468    3/2004
(Continued)

OTHER PUBLICATIONS

International Search Report Issued Sep. 27, 2012 in PCT/FR12/51383 Filed Jun. 19, 2012.

*Primary Examiner* — Igor Kershteyn
*Assistant Examiner* — Eldon Brockman
(74) *Attorney, Agent, or Firm* — Oblon, McClelland, Maier & Neustadt, L.L.P.

(57) ABSTRACT

A dual-flow turbine engine including: a fan rotatably mounted on a fan shaft and a stationary structural element, the fan shaft and the structural element being connected to one another at an upstream bearing and at a downstream bearing via an upstream bearing bracket and a downstream bearing bracket, respectively; and a decoupling device surrounding the fan shaft, and including a set of attachment screws joining the downstream bearing bracket to the structural element and a set of fusible screws joining the upstream bearing bracket to the downstream bearing bracket. At least some of the fusible screws are arranged between at least some of the attachment screws over a single circumference surrounding the fan shaft.

9 Claims, 4 Drawing Sheets

(51) Int. Cl.
   *F01D 25/16*      (2006.01)
   *F02K 3/06*       (2006.01)
(52) U.S. Cl.
   CPC .. *F05B 2260/301* (2013.01); *F05B 2260/3011* (2013.01); *F05D 2250/30* (2013.01)

(56) References Cited

U.S. PATENT DOCUMENTS

| | | | |
|---|---|---|---|
| 6,402,469 B1* | 6/2002 | Kastl | F01D 21/045 415/9 |
| 6,428,269 B1* | 8/2002 | Boratgis | F01D 21/045 411/2 |
| 7,195,444 B2* | 3/2007 | Brault | F01D 25/16 415/9 |
| 7,237,959 B2* | 7/2007 | Bouchy | F01D 21/045 384/445 |
| 8,573,922 B2* | 11/2013 | Milfs | F16C 19/56 384/624 |
| 9,169,728 B2* | 10/2015 | Wallace | F01D 21/04 |
| 2005/0117828 A1* | 6/2005 | Bouchy | F01D 21/045 384/535 |
| 2006/0087396 A1 | 4/2006 | Bouchy et al. | |
| 2006/0110244 A1* | 5/2006 | Brault | F01D 25/16 415/110 |
| 2007/0081852 A1 | 4/2007 | Bouchy et al. | |
| 2009/0154863 A1 | 6/2009 | Decerle et al. | |
| 2011/0305567 A1* | 12/2011 | Milfs | F16C 19/56 415/229 |
| 2013/0149139 A1* | 6/2013 | Wallace | F01D 21/04 415/214.1 |
| 2013/0236291 A1* | 9/2013 | Decerle | F01D 21/045 415/9 |

FOREIGN PATENT DOCUMENTS

| | | |
|---|---|---|
| EP | 1 653 051 | 5/2006 |
| EP | 2 071 138 | 6/2009 |

* cited by examiner

DUAL-FLOW TURBINE ENGINE HAVING A DECOUPLING DEVICE

The present invention relates to dual-flow turbine engines.

It is known that dual-flow turbine engines include a fixed structural element (stator), called an intermediate casing, including a hub supporting the shafts which support the different rotors (fan, compressor, etc.), an outside annular casing which separates the primary flow (hot) from the secondary flow (cold), as well as a plurality of radial connecting arms between the hub and the outside annular casing.

The fan shaft and said structural element are connected to one another by means of an upstream bearing and a downstream bearing.

Consequently, if a blade of the fan breaks, a large imbalance appears on the fan shaft, which generates cyclical loadings and vibrations which the upstream bearing communicates to the structural element, risking not inconsiderable damage.

So as to limit the stresses transmitted to the fixed structure of the aircraft at the time of such a loss of a blade, SNECMA document FR 2 831 624 makes known a decoupling device for a dual-flow turbine engine which includes a fan which is rotatably mounted on a fan shaft and a fixed structural element, said fan shaft and said structural element being connected to one another at an upstream bearing and a downstream bearing, respectively by means of an upstream bearing support and a downstream bearing support, said decoupling device surrounding said fan shaft and including:
- a set of fixing screws which join the downstream bearing support to said structural element using a fixed connection, and
- a set of rupture screws which join the upstream bearing support to said downstream bearing support using a rupturable connection.

Said so-called "rupture" screws, the operation of which is amply described in the aforesaid document, have a portion with a reduced section which is capable of rupturing beyond a predetermined mechanical tensile stress and thus of realizing the decoupling of the upstream bearing and of the downstream bearing.

Thus, two screw rings (one ring of fixing screws and one ring of rupture screws in tension) are formed, being stacked radially around the fan shaft. It follows that as soon as an imbalance is present (as a result, for example, of one fan blade rupturing), the rupturing of the rupture screws in tension brings about a decoupling of the upstream bearing support vis-à-vis the structural element (by means of the downstream bearing support to which it is fixed) after a limited number of revolutions of the fan shaft.

In said configuration, however, when the rupture screws in tension rupture, the front end of the low-pressure compressor shafting is no longer connected to the structure and it starts to orbit around its new center of gravity. This causes the low-pressure turbine shaft to bend which makes it likely to rub against the high-pressure compressor shafting which is coaxial to it and which rotates at a clearly higher speed, bringing about a not inconsiderable probability of damage to the two engine shaftings.

To alleviate said problem, the aforementioned document FR 2 831 624 proposes arranging a second decoupling device between the downstream bearing and the fixed structural element, said second device including a set of rupture screws in shear. Consequently, the freed supplementary play at the downstream bearing allows the rubbing between the low-pressure turbine shafts and the high-pressure compressor shafts to be limited—or even avoided.

However, on some types of turbine engine, the axial thrust of the turbine engine can be great, which necessitates installing a large-size thrust bearing. The large amount of space required to do this generally means that said thrust bearing is installed downstream.

Consequently, the radial space required by the thrust bearing, between the structural element and the fan shaft, limits in a significant manner the space available for the first decoupling device referred to above, which, furthermore, prevents the lubrication circuits being properly run in said area as well as the openings necessary for good ventilation in said area being installed in the downstream bearing support.

What is more, the above-described configuration of the rupture screws necessitates said screws being sealed, which implies the addition of a specifically dedicated cover and therefore contributes to the increase in the space taken up.

One object of the present invention, therefore, is to reduce the space required by the removable decoupling device from document FR 2 831 624 so that a larger available space can be allocated, between the structural element and the fan shaft, for the installation of the ducts and ventilating means necessary for the proper operation of the turbine engine.

To this end, as claimed in the present invention, the turbine engine with a decoupling device such as is defined above is remarkable by the fact that the rupture screws of the device are inserted between the fixing screws over a same circumference which surrounds the fan shaft.

Thus, thanks to the present invention, as the two rings of screws (fixing screws and breakable screws in tension) are installed at an identical (or close) set up diameter, the radial stack of said rings of screws becomes an axial stack, which allows the radial space taken up by the decoupling device as claimed in the invention to be reduced in a significant manner, and therefore the space available for the ducting and ventilating means to be increased.

Furthermore, thanks to the invention, as the fixing screws and the rupture screws in tension are inserted on a same flange, a sealed cover and the O-ring thereof are no longer necessary to seal the said rupture screws, which thus makes it possible to reduce the thickness of the flange of the structural element and therefore to increase the available space for the ducts and ventilating means a little more.

It will be noted, moreover, that said new configuration of the rings of screws does not influence the mounting sequence of the decoupling device whatsoever.

Furthermore, the invention allows the inaccessibility of the rupturable connection between the fan shaft and the fixed structural element to be preserved when the decoupling device as claimed in the invention is mounted on the turbine engine.

Furthermore, again thanks to the invention, it is from then on possible to arrange the rupture screws in tension outside the area between the fan shaft and the structural element, which allows the rotating elements to be protected insofar as no scrap (notably the heads of ruptured screws and the washers) is located in said area after rupture, the threads and the rest of the rupture screws being able to be trapped, moreover, in the cavities of the structural element.

In a preferred manner, all the rupture screws of the decoupling device are inserted between the fixing screws.

As claimed in a particular embodiment, in order to limit the space taken up by the decoupling device as claimed in the invention to the maximum, at least one of the rupture screws is inserted between two fixing screws.

As claimed in another particular embodiment, at least one of the rupture screws is inserted between n-tuples of fixing screws. In this case, a rupture screw can be inserted, for example, between two pairs of fixing screws.

Consequently, all the fixing screws and all the rupture screws can be distributed in an advantageous manner over a single circumference which surrounds the fan shaft.

In a preferred manner, also over the circumference mentioned above which surrounds said fan shaft, the fixing screws and the rupture screws are arranged in an alternating manner which promotes symmetry and balance in the ring of screws, each rupture screw being inserted between two fixing screws or two n-tuples of fixing screws.

As claimed in a particular embodiment, the downstream bearing is a thrust bearing which is subject to the axial thrust of the turbine engine. Said downstream bearing also allows the rubbing between the low-pressure and high-pressure shafts to be limited (or avoided) after decoupling.

So as to take account of the space necessary for the ducting and ventilating means of the primary path, the downstream bearing support has a dimension which is adapted to the accommodation of the ducting and ventilating means.

So as to allow for the installation of the fixing screws of the device, the upstream bearing support has, in the area of at least one fixing screw, an orifice for the passage of a tightening tool for said screw.

As claimed in another characteristic of the invention, at least one breakable screw can have a screw head the form of which is adapted to avoid any outside interference so as to protect the tightening of said screw and therefore the calibration of the decoupling device.

Moreover, at least one of the rupture screws in tension can be arranged bearing against the upstream bearing support by means of a washer. Furthermore, the thread of at least one of the rupture screws can be tightened by means of a nut which is accommodated in a cavity arranged in the interior of the structural element.

An anti-rotation mechanism for the corresponding rupture screw can be inserted in the interior of at least one cavity of the downstream bearing support.

In an advantageous manner, a counter bore is arranged in the downstream bearing support such that at least part of a fixing screw may be embedded into said counter bore, which allows the corresponding part of a fixing screw to be protected after rupture of the rupture screw when a blade is lost.

The figures of the accompanying drawing will make it easy to understand how the invention can be realized. In said figures, identical references designate similar technical elements.

Figure 1:
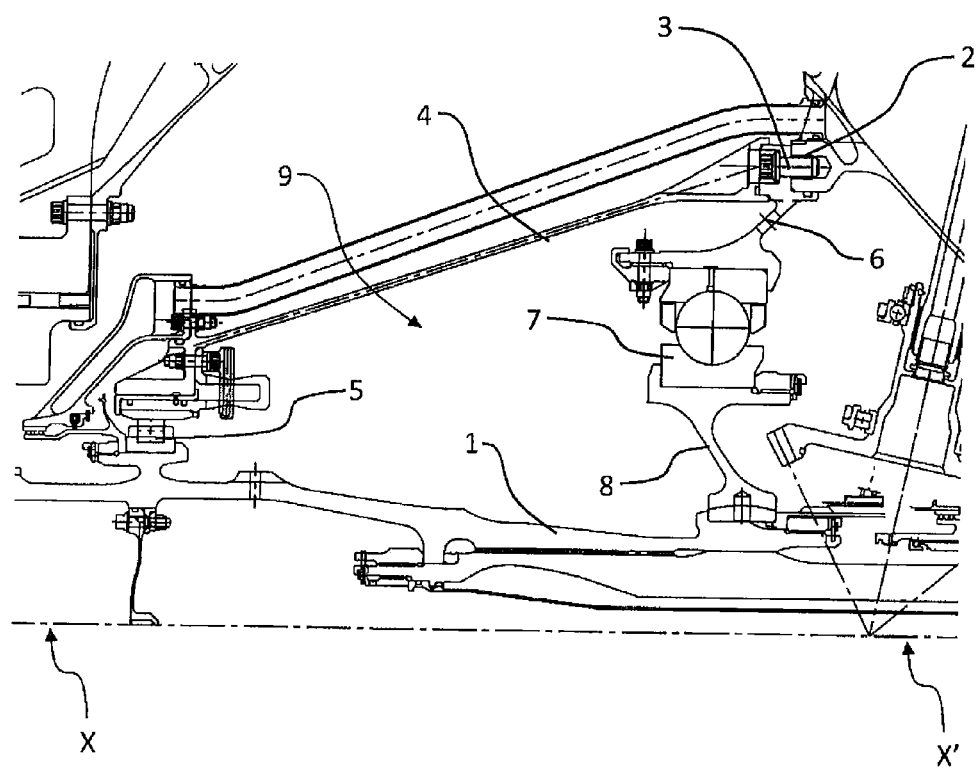
FIG. 1 is a radial half-section of the area between the fan shaft and the fixed structural element of a dual-flow turbine engine which is provided with a decoupling device as claimed in the invention.

The part of the dual-flow turbine engine shown in FIG. 1 corresponds to a portion of the fan shaft 1 (rotor), capable of rotating around the axis X-X' of the engine, and a portion of the structural element 2 (stator), for example the hub of the intermediate casing. Said shaft 1 supports, in the upstream part thereof (in the sense of the flow of gases), a fan which is provided with blades (not shown) which extend in front of the entry of the internal (or primary) path of the flow of gases and of the external (or secondary) path which surrounds this latter which is used for dilution air.

The fan shaft 1 and the structural element 2 are connected to one another at an upstream bearing 5 and a downstream bearing 7, respectively by means of an upstream bearing support 4 and a downstream bearing support 6, all arranged downstream of the fan.

A decoupling device 3, moreover, is arranged so as to couple, on the one hand, the structural element 2, and, on the other hand, the upstream bearing support 4 and the downstream bearing support 6. To this end, the decoupling device 3, which surrounds the fan shaft 1 in a concentric manner, includes first of all a set of fixing screws 10 (FIG. 2) which join the downstream bearing support 6 to the structural element 2 using a fixed connection. In a similar manner, the decoupling device 3 also includes a set of rupture screws 20 (FIG. 3), for example in tension, which join the upstream bearing support 4 to the downstream bearing support 6, using a rupturable connection.

The downstream bearing 7, moreover, is connected to the fan shaft 1 by means of an additional downstream bearing support 8.

Figure 2:
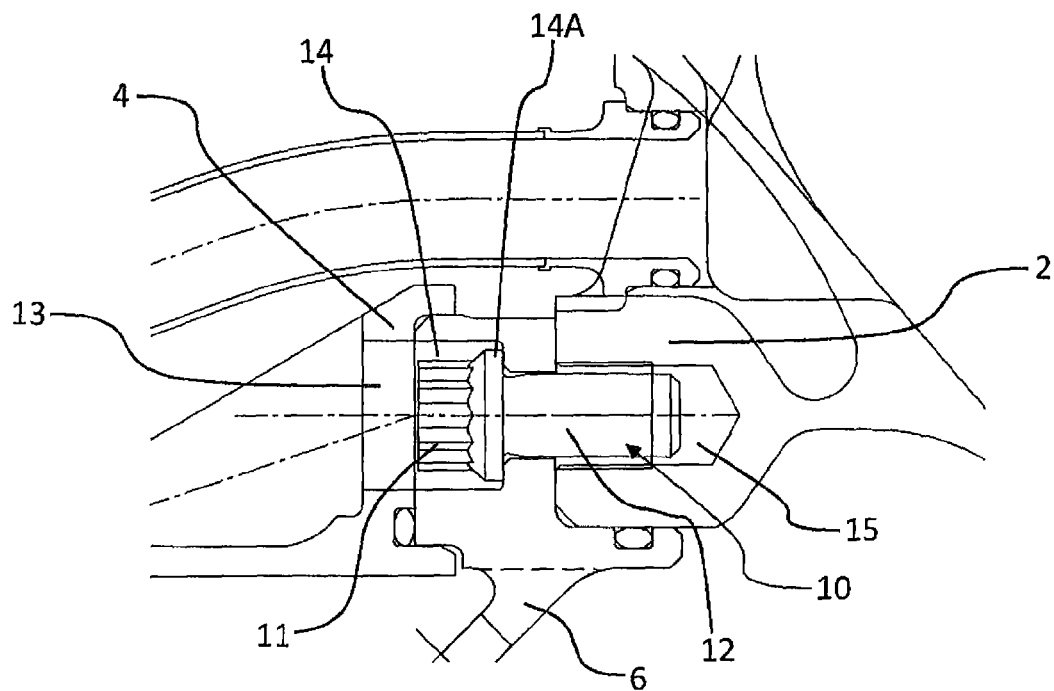
FIG. 2 is a view of the decoupling device as claimed in a first embodiment of the invention, in a radial sectional plane including a fixing screw.
Figure 3:
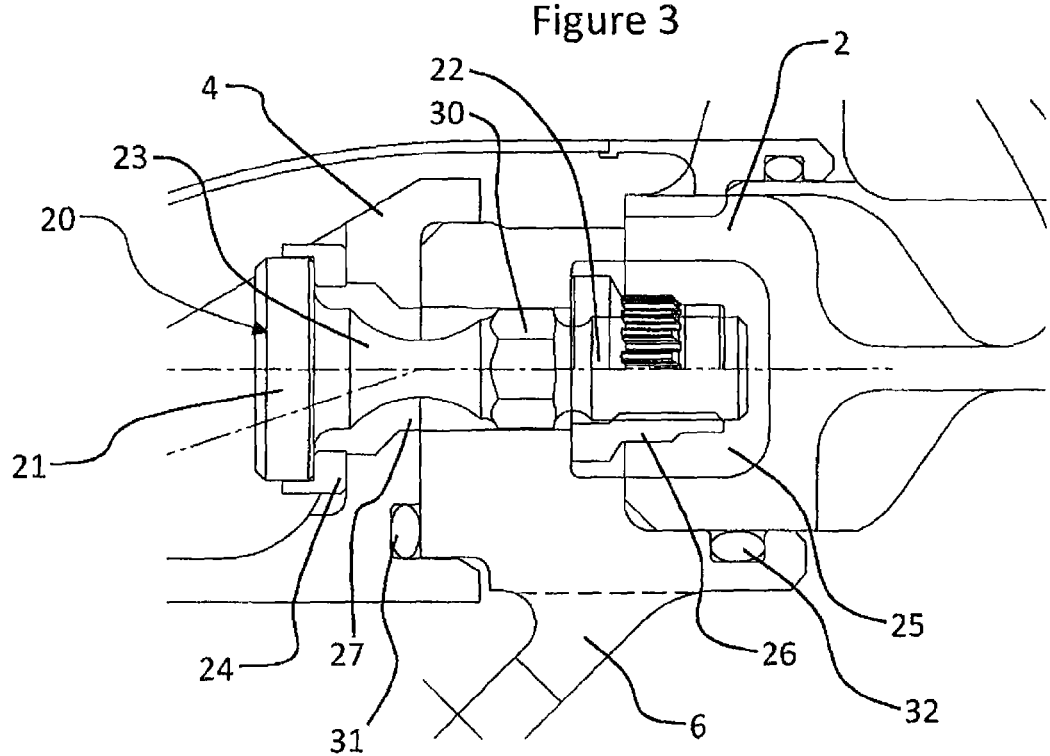
FIG. 3 is a view of the removable coupling device of FIG. 2, in a radial sectional plane including a rupture screw in tension.

The decoupling device 3 is shown in more detail in FIGS. 2 and 3. This latter is made up by the aforementioned sets of fixing screws 10 (FIG. 2) and of rupture screws 20 (FIG. 3), said screws being distributed on a ring (part of which is visible in FIGS. 4A, 4B and 4C) which surrounds the fan shaft 1, by means of revolution around the longitudinal axis X-X' of the turbine engine.

The fixing screws 10, of the type of that shown in FIG. 2, are intended to keep the downstream bearing support 6 against the structural element 2. To this end, each screw 10 is made up by a screw head 11 and a thread 12. An orifice 13 is made in the upstream bearing support 4, to which the screw 10 is not intended to be fixed, so as to allow for the passage of a tightening tool for the said screw 10. A counter bore 14 is also arranged in the downstream bearing support 6, such that the head of the screw 11 is able to be embedded in said counter bore 14 as far as up to a stop 14A, which allows said head 11 to be protected after rupture of the rupture screws 20 when a blade is lost. Moreover, a tapped cavity 15 is arranged in the structural element 2 so as to screw in the thread 12 there.

The rupture screws 20, of the type of that shown in FIG. 3, are intended to keep the upstream bearing support 4 against the downstream bearing support 6 as long as no imbalance—brought about by a loss of a fan blade—has appeared on the fan. To this end, each screw 20 is made up by a screw head 21 and a thread 22. The rupturing nature of the screw 20 is shown by a smooth portion with a reduced section 23, arranged between the head 21 and the thread 22, so as to serve as the release for the rupture in tension (the rupture screw of FIG. 3 is thus a rupture screw in tension).

Thus, if one of the fan blades becomes detached from the fan, the cyclical radial stress transmitted to the fan shaft 1 and to the upstream bearing 5 is converted into cyclical axial stress on each rupture screw 20, the screws 20 therefore being ruptured by tension at their reduced section portions 23 when said stress becomes sufficient. The rupture screws 20 which are arranged around the aforementioned circumference will normally be ruptured one after the other in one single revolution of the fan shaft 1, all the more easily as the mechanical resistance of the assembly will decrease continually in line with the ruptures already produced. The upstream bearing support 4 will then be detached from the downstream bearing support 6 and will therefore no longer transmit stress to the structural element 2.

It will be noted that, in such a situation in which the upstream bearing support 4 ruptures, the upstream bearing 5 is no longer able to support the fan. The fan shaft 1 is therefore only still supported by the downstream bearing 7 which starts, in turn, to transmit the cyclical stresses. So as to control said stresses, rupture screws in shear can be arranged between the structural element 2 and the downstream bearing 7. However, when said stresses become too great, a downstream bearing 7 in the form of a thrust bearing (if possible large-size), such as shown in FIG. 1, is preferred, which makes the use of rupture screws in shear unnecessary, or even harmful as a result of the small amount of space available in the area 9 (can be seen in FIG. 1) separating the fan shaft 1 and the fixed structural element 2.

The screw head 21, the form of which is adapted to avoid any outside interference, bears against the upstream bearing support 4 by means of a washer 24. Moreover, the thread 22 of the rupture screw 20 is tightened by means of an inaccessible nut 26 on the engine as it is mounted inside a cavity 25 arranged in the structural element 2. This completes the protection of the tightening torque of the rupture screw which has a direct influence on the rupturing stress of the screw. Moreover, an anti-rotation device 28 of the breakable screw 20 is inserted inside the clearance hole in the flange of the downstream bearing support 6. In an advantageous manner, said anti-rotation device is realized by means of a hexagonal orifice 28 which stops the hexagonal sector 30 of the rupture screw 20 from rotating.

Figure 4A:
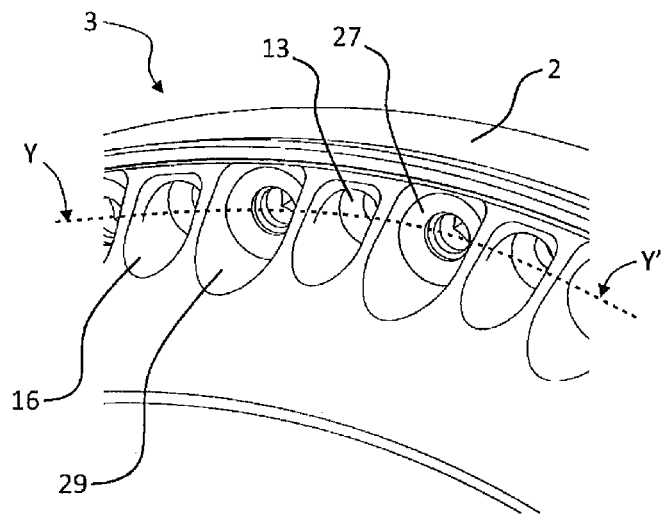
FIGS. 4A, 4B and 4C are respectively partial views in perspective of a portion of the ring of screws which forms the decoupling device of FIGS. 2 and 3, in successive axial sectional planes.
Figure 4B:
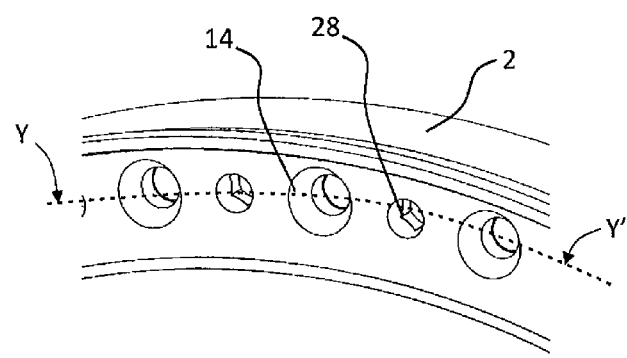
Figure 4C:
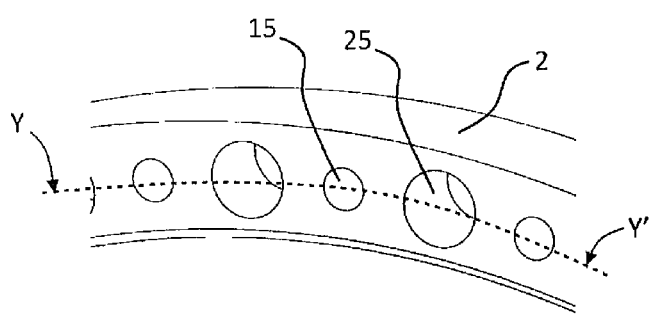

As claimed in the present invention, the fixing screws 10 and the rupture screws 20 are distributed on a same, single circumference Y-Y' which surrounds the fan shaft 1 (FIGS. 4A to 4C). More precisely, said screws 10 and 20 are installed in an alternating manner, one fixing screw 10 (or one n-tuple of fixing screws 10) being inserted between two rupture screws 20. Said arrangement is shown in FIGS. 4A, 4B and 4C, using different radial sectional planes.

In FIG. 4A, the flange of the upstream bearing support 4 can be seen mounted on the downstream bearing support 6 and the structural element 2, seen from upstream. The flange of the structural element 2—on which is positioned the decoupling device 3 as claimed in the invention—is provided with a plurality of orifices, through which the fixing screws 10 and the rupture screws 20 pass. The orifices corresponding to the screws 10 and 20 are distributed in an equidistant and alternating manner on the circumference Y-Y'.

Moreover, in said same drawing, the orifice for the fixing screw 10 includes the orifice 13 which is provided for the passage of a tightening tool for said screw, whilst the orifice for the breakable screw 20 includes a clearance opening 27 (see also FIG. 3).

In FIG. 4B, the flange of the downstream bearing support 6 can be seen mounted on the flange of the structural element 2, seen from upstream. The orifice for the fixing screw 10 includes the aforementioned counter bore 14 which allows said screw 10 to be embedded, whilst the orifice for the rupture screw 20 includes an anti-rotation mechanism 28 (not shown in FIG. 3), with a hexagonal section.

FIG. 4C just shows the flange of the structural element 2, seen from upstream. The orifice for the fixing screw 10 includes the tapped cavity 15—or socket—for the screwing-in of the thread 12, whilst vis-à-vis the rupture screw 20, a cavity 25 is situated in the flange of the structural element 2, for the purpose of making the nut 26 which is tightened on the thread 22 of said screw 20 inaccessible, and which also contributes to the sealing to the right of the rupture screw.

Thus, the mounting of the fixing screws 10 and of the rupture screws 20 in the decoupling device 3 as claimed in the invention brings about a minimum amount of space taken up, which allows a sufficiently large space to be left free for the accommodation of the ducting and ventilating means necessary for proper operation of the turbine engine, through the downstream bearing support 6.

Furthermore, the cavity 25 which is realized in the structural element 2 also makes it possible to ensure sealing to the right of the rupture screw 20, which avoids recourse to a cover specifically dedicated to said sealing. Said sealing is realized by two O-rings and 32, located respectively between the bearing supports 4 and 6 and between the downstream bearing support 6 and the structural element 2.

Although the portion of the engine shown in FIG. 1 corresponds to a view in a radial sectional plane, it will be understood that the configuration shown above is made over the entire circumference of the turbine engine such that the elements described above surround the fan shaft 1, around the axis X-X' of the engine.

Figure 5:
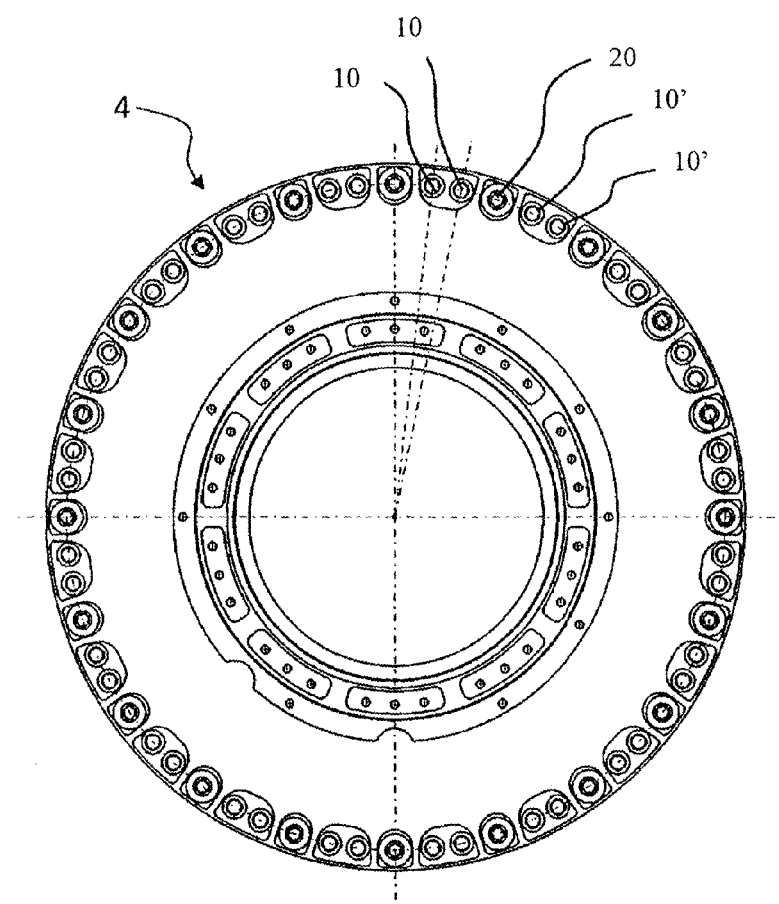
FIG. 5 is a view from above of a decoupling device as claimed in a second embodiment of the invention.

It will be noted that in some cases it can be necessary to adapt the number of fixing screws and the number of rupture screws according to the stresses to which each ring of screws has to be subjected. Also, it can be judicious for the number of fixing screws not to be equal to the number of rupture screws. In said case, a rupture screw can be inserted between two n-tuples of fixing screws, as is shown in FIG. 5, where one rupture screw 20 is inserted between two pairs of fixing screws 10 and 10' and where the decoupling device thus includes twice as many fixing screws 10 and 10' as rupture screws 10.

The invention claimed is:

1. A dual-flow turbine engine comprising:
    a fan which is rotatably mounted on a fan shaft and a fixed structural element, the fan shaft and the structural element being connected to one another at an upstream bearing and a downstream bearing, respectively by an upstream bearing support and a downstream bearing support; and
    a decoupling device which surrounds the fan shaft and includes:
        a set of fixing screws which join the downstream bearing support to the structural element using a fixed connection, and
        a set of rupture screws which join the upstream bearing support to the downstream bearing support using a rupturable connection;
    wherein the rupture screws are inserted between the fixing screws over a same circumference that surrounds the fan shaft.

2. The turbine engine as claimed in claim 1, wherein the rupture screws of the decoupling device are inserted between the fixing screws.

3. The turbine engine as claimed in claim 2, wherein at least one of the rupture screws is inserted between two fixing screws.

4. The turbine engine as claimed in claim 2, wherein at least one of the rupture screws is inserted between two n-tuples of fixing screws.

5. The turbine engine as claimed in claim 1, wherein all the fixing screws and all the rupture screws of the decoupling device are distributed over a single circumference that surrounds the fan shaft.

6. The turbine engine as claimed in claim 1, wherein the downstream bearing support is traversed by ducting and ventilating means, with a dimension to accommodate the ducting and ventilating means.

7. The turbine engine as claimed in claim 1, wherein the upstream bearing support, in an area of at least one fixing screw, includes an orifice for passage of a tightening tool for the at least one fixing screw.

8. The turbine engine as claimed in claim 1, wherein at least one of the rupture screws includes a screw head with a form configured to avoid any outside interference.

9. The turbine engine as claimed in claim 1, wherein a counter bore is arranged in the downstream bearing support such that at least part of a fixing screw may be embedded into the counter bore.

\* \* \* \* \*

UNITED STATES PATENT AND TRADEMARK OFFICE
CERTIFICATE OF CORRECTION

| | |
|---|---|
| PATENT NO. | : 9,512,847 B2 |
| APPLICATION NO. | : 14/124963 |
| DATED | : December 6, 2016 |
| INVENTOR(S) | : Regis Eugene Henri Servant |

It is certified that error appears in the above-identified patent and that said Letters Patent is hereby corrected as shown below:

Column 6, Line 20, change "O-rings and 32" to --O-rings 31 and 32--.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*